US012562823B2

(12) United States Patent
Otsuki et al.

(10) Patent No.:    US 12,562,823 B2
(45) Date of Patent:        Feb. 24, 2026

(54) WIRELESS COMMUNICATION SYSTEM WITH OBJECT DETECTION FUNCTION, OBJECT DETECTION METHOD AND BASE STATION DEVICE

(71) Applicant: NTT, Inc., Tokyo (JP)

(72) Inventors: Shinya Otsuki, Musashino (JP);
Tomoki Murakami, Musashino (JP);
Tomoaki Ogawa, Musashino (JP)

(73) Assignee: NTT, Inc., Tokyo (JP)

( * ) Notice: Subject to any disclaimer, the term of this patent is extended or adjusted under 35 U.S.C. 154(b) by 261 days.

(21) Appl. No.: 18/026,501

(22) PCT Filed: Sep. 18, 2020

(86) PCT No.: PCT/JP2020/035581
§ 371 (c)(1),
(2) Date: Mar. 15, 2023

(87) PCT Pub. No.: WO2022/059198
PCT Pub. Date: Mar. 24, 2022

(65) Prior Publication Data
US 2023/0361890 A1      Nov. 9, 2023

(51) Int. Cl.
*H04B 17/20*      (2015.01)
*H04B 17/391*      (2015.01)
*H04L 5/00*      (2006.01)

(52) U.S. Cl.
CPC ....... *H04B 17/204* (2023.05); *H04B 17/3913* (2015.01); *H04L 5/0048* (2013.01)

(58) Field of Classification Search
CPC .. H04B 7/0617; H04B 7/0695; H04B 17/309; H04B 7/024; H04B 7/063; H04B 7/0632;
(Continued)

(56) References Cited

U.S. PATENT DOCUMENTS

2020/0333456 A1*  10/2020  Ying ........................ G01S 7/006
2021/0092013 A1*   3/2021  Zhou ..................... G01S 13/765

FOREIGN PATENT DOCUMENTS

JP          2005222289 A      8/2004
WO    WO-2017/207041 A1   12/2017

OTHER PUBLICATIONS

Ryo Takahashi et al, "DNN-based Outdoor NLOS Human Detection Using IEEE 802.11ac WLAN Signal", IEEE Sensors, Oct. 2019.
(Continued)

*Primary Examiner* — Ajibola A Akinyemi

(57)      ABSTRACT
Provided is a wireless communication system that detects an object inside a communication area including: a base station device; and a terminal device, in which the base station device controls a timing for transmitting a reference signal for measuring a state of a propagation path on the basis of a pilot signal included in a wireless signal received from the terminal device during wireless communication and detects an object inside the communication area on the basis of propagation state information indicating a state of the propagation path received from the terminal device during wireless sensing, and the terminal device transmits, to the base station device, propagation state information measured on the basis of a reference signal received from the base station device. It is thus possible to transmit the reference signal for measuring a state of the propagation path without degrading a throughput of wireless communication.

5 Claims, 7 Drawing Sheets

(58) Field of Classification Search
CPC .... H04B 17/345; H04B 7/15542; H04B 1/12;
H04B 1/3827; H04B 17/24; H04B 17/26;
H04B 17/336; H04B 7/0452
USPC ...................................................... 455/67.11
See application file for complete search history.

(56) References Cited

OTHER PUBLICATIONS

Masahiko Miyazaki et al. (May 6, 2019) "Initial Attempt on Outdoor Human Detection using IEEE 802.11ac WLAN Signal" 2019 IEEE Sensors Applications Symposium (SAS) [online].

* cited by examiner

100

101

AP

104(4)  104(3)  104(2)  104(1)

OBJECT
103

102

STA

WIRELESS COMMUNICATION SYSTEM WITH OBJECT DETECTION FUNCTION, OBJECT DETECTION METHOD AND BASE STATION DEVICE

CROSS-REFERENCE TO RELATED APPLICATIONS

This application is a 371 U.S. National Phase of International Application No. PCT/JP2020/035581, filed on Sep. 18, 2020. The entire disclosure of the above application is incorporated herein by reference.

TECHNICAL FIELD

The present invention relates to a technique for controlling a transmission timing of a reference signal for measuring propagation state information in a wireless communication system with a function of detecting an object in a communication area on the basis of propagation state information of a wireless signal.

BACKGROUND ART

In the related art, a method of detecting an object inside a communication area in a wireless local area network (LAN) system has been proposed (see Non Patent Literature 1, for example). According to this method, a Very High Throughput Null Data Packet (VHT NDP) is transmitted as a reference signal for measuring a propagation path state from an access point (AP) corresponding to a base station device to a station (STA) corresponding to a terminal device. The STA calculates Channel State Information (CSI) indicating states of propagation paths between a plurality of antennas of the AP and the STA on the basis of the VHT NDP and transmits the result to the AP using a VHT Compress Beam Forming Report. Then, the AP detects an object inside the communication area on the basis of the CSI.

CITATION LIST

Non Patent Literature

Non Patent Literature 1: "DNN-based Outdoor NLOS Human Detection Using IEEE 802.11ac WLAN Signal" IEEE SENSORS, 2019

SUMMARY OF INVENTION

Technical Problem

According to the method in Non Patent Literature 1, a VHT NDP and a VHT Compress Beam Forming Report are periodically transmitted and received at specific intervals, and detection of an object is performed on the basis of CSI stored in the VHT Compress Beam Forming Report. Therefore, the detection timing of the object is limited to the transmission and reception timing of these signals. Here, if the period cycle of these signals is shortened, the proportion of a communication time that these signals occupy increases relative to the entire communication time, and a throughput of wireless LAN communication is degraded.

Although it is necessary to frequently transmit reference signals for measuring a state of a propagation path in order to shorten the intervals of object detection in this manner, there is a problem that the reference signals have high time occupancy relative to the entire communication time and put pressure on ordinary traffic.

An object of the present invention is to provide a wireless communication system, an object detection method, and a base station device with an object detecting function capable of transmitting a reference signal for measuring a state of a propagation path at an appropriate timing without degrading a throughput of wireless communication in a case in which an object inside a communication area of the wireless communication system including the base station device and a terminal device is detected.

Solution to Problem

The present invention provides a wireless communication system that detects an object inside a communication area, including: a base station device; and a terminal device, in which the base station device controls a timing for transmitting a reference signal for measuring a state of a propagation path on the basis of a pilot signal included in a wireless signal received from the terminal device during wireless communication and detects an object inside the communication area on the basis of propagation state information indicating a state of the propagation path received from the terminal device during wireless sensing, and the terminal device transmits, to the base station device, the propagation state information measured on the basis of the reference signal received from the base station device.

Also, the present invention provides an object detection method of detecting an object inside a communication area of a wireless communication system including a base station device and a terminal device, the method including: by the base station device, controlling a timing for transmitting a reference signal for measuring a state of a propagation path on the basis of a pilot signal included in a wireless signal received from the terminal device during wireless communication and detecting an object inside the communication area on the basis of propagation state information indicating a state of the propagation path received from the terminal device during wireless sensing; and by the terminal device, transmitting, to the base station device, the propagation state information measured on the basis of the reference signal received from the base station device.

Also, the present invention provides a base station device that performs wireless communication with a terminal device and detects an object inside a communication area, including: a detection unit that detects a timing for transmitting a reference signal for measuring a state of a propagation path on the basis of a pilot signal included in a wireless signal received from the terminal device during wireless communication; a transmission unit that transmits a reference signal for measuring a state of the propagation path at the transmission timing detected by the detection unit on the basis of the pilot signal; and an object detection unit that receives propagation state information measured using the reference signal from the terminal device and detects an object inside the communication area on the basis of the propagation state information.

Advantageous Effects of Invention

The wireless communication system with an object detection function, the object detection method and the base station device according to the present invention can transmit a reference signal for measuring a state of a propagation path at an appropriate timing without degrading a throughput of wireless communication in a case in which an object inside a communication area of the wireless communication system including the base station device and a terminal device is detected.

DESCRIPTION OF EMBODIMENTS

Hereinafter, embodiments of a wireless communication system with an object detection function, an object detection method, and a base station device according to the present invention will be described with reference to the drawings.

Although a case in which the wireless communication system is a wireless LAN system will be described here in the embodiments, the present invention can be similarly applied to any system as long as it includes at least two wireless devices, namely a base station device and a terminal device, for example.

Figure 1:
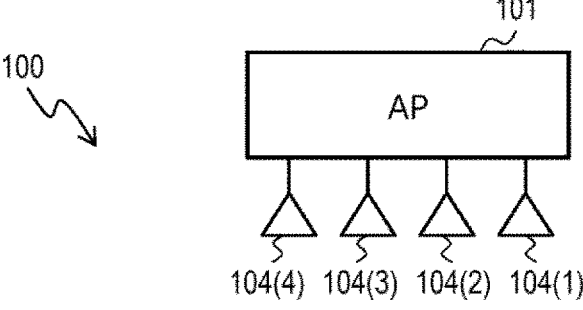
FIG. 1 is a diagram illustrating an example of a wireless LAN system according to an embodiment.
Figure 1:
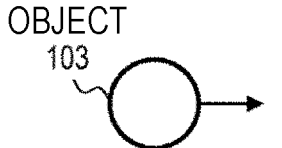
Figure 1:
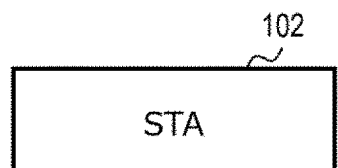

FIG. 1 illustrates an example of a wireless LAN system 100 according to an embodiment. The wireless LAN system 100 is compatible with the wireless LAN standard 802.11ac and includes an AP 101 corresponding to the base station device and an STA 102 corresponding to the terminal device. Here, the wireless LAN system 100 according to the present embodiment performs wireless communication of transmitting and receiving ordinary wireless signals between the AP 101 and the STA 102 and wireless sensing of detecting an object 103 inside a communication area.

During wireless communication, data signals including pilot signals are transmitted and received between the AP 101 and the STA 102.

During wireless sensing, the AP 101 measures a state of a propagation path between itself and the STA 102 and detects the object 103 inside the communication area on the basis of the state of the propagation path. For example, the AP 101 measures a state of a propagation path between each of a plurality of antennas 104 and the STA 102 and detects the object 103 inside the communication area from a change in state of the propagation path of each antenna 104.

Note that the detection of the object 103 may be performed by the STA 102 or an object detection apparatus may be provided separately from the AP 101 and the STA 102. In this case, the object detection apparatus acquires propagation state information (referred to as CSI) indicating a state of a propagation path from the AP 101 or the STA 102 and detects the object 103 inside the communication area on the basis of the CSI. In the following embodiment, a case in which the AP 101 has a function of wireless sensing for detecting the object 103 inside the communication area will be described.

In FIG. 1, the AP 101 includes four antennas 104(1), 104(2), 104(3), and 104(4). Note that, in the description of the embodiment, (number) at the end of the reference sign will be omitted for matters common to the antennas 104(1) to 104(4) and these will be described as antennas 104. In a case in which a specific antenna 104 is indicated, (number) is applied to the end of the reference sign, and description as in an antenna 104(1) will be used.

Although the AP 101 illustrated in FIG. 1 includes the four antennas 104, it is only necessary to include two or more antennas 104 capable of measuring a state of each propagation path between the STA 102 and each antenna 104.

Note that, although the STA 102 is assumed to include one antenna in the embodiment, the STA 102 may include a plurality of antennas. Although FIG. 1 illustrates an example in which the number of STAs 102 is one, the present embodiment can also be applied to a case in which Multi User Multiple Input Multiple Output (MU-MIMO) transmission is performed between the AP 101 and the plurality of STAs 102.

In FIG. 1, the AP 101 transmits a Very High Throughput Null Data Packet (VHT NDP) as a reference signal for measuring the CSI to the STA 102. The STA 102 measures the CSI representing the state of the propagation path of each of the four antennas 104 of the AP 101 on the basis of the VHT NDP. Then, the STA 102 transmits CSI compressed on the basis of a wireless LAN standard to the AP 101 using a VHT Compress Beam Forming Report. The AP 101 detects an object inside the communication area on the basis of a change in CSI received from the STA 102.

Here, the VHT NDP is transmitted at a cycle determined in advance by the wireless LAN standard, the CSI is measured every time the VHT NDP is transmitted, and the intervals of the object detection thus depend on the transmission intervals of the VHT NDP. In other words, it is necessary to frequently transmit the VHT NDP for measuring the CSI in order to shorten the intervals of object detection. However, if the transmission frequency of the VHT NDP increases, there is a problem that time occupancy with respect to communication traffic increases and it puts pressure on ordinary traffic.

Thus, not only the VHT NDP periodically transmitted at predetermined relatively long intervals but also pilot signals used for traffic during ordinary wireless communication are used in the embodiment. The pilot signals are known signals that are periodically transmitted at shorter intervals than those of the VHT NDP for demodulation such as quadrature amplitude modulation (QAM). The AP 101 according to the embodiment determines that there is a high likelihood that an object has entered the communication area in a case in which the pilot signals received from the STA 102 have changed and transmits the VHT NDP at that timing. In this manner, the intervals of object detection are shortened, and it is possible to prevent the transmission of the VHT NDP from putting pressure on ordinary traffic.

Note that, although a case in which the VHT NDP is transmitted when the pilot signals change instead of the VHT NDP being periodically transmitted at relatively long intervals will be described in the embodiment, the VHT NDP may be transmitted only in a case in which the pilot signals change instead of the VHT NDP being periodically transmitted.

In this manner, the wireless LAN system 100 according to the embodiment controls a transmission timing of the VHT NDP for measuring a state of a propagation path using the pilot signals in a case in which an object inside the communication area between the AP 101 and the STA 102 is detected. It is thus possible to efficiently detect the object without degrading the throughput of wireless communication.

Figure 2:
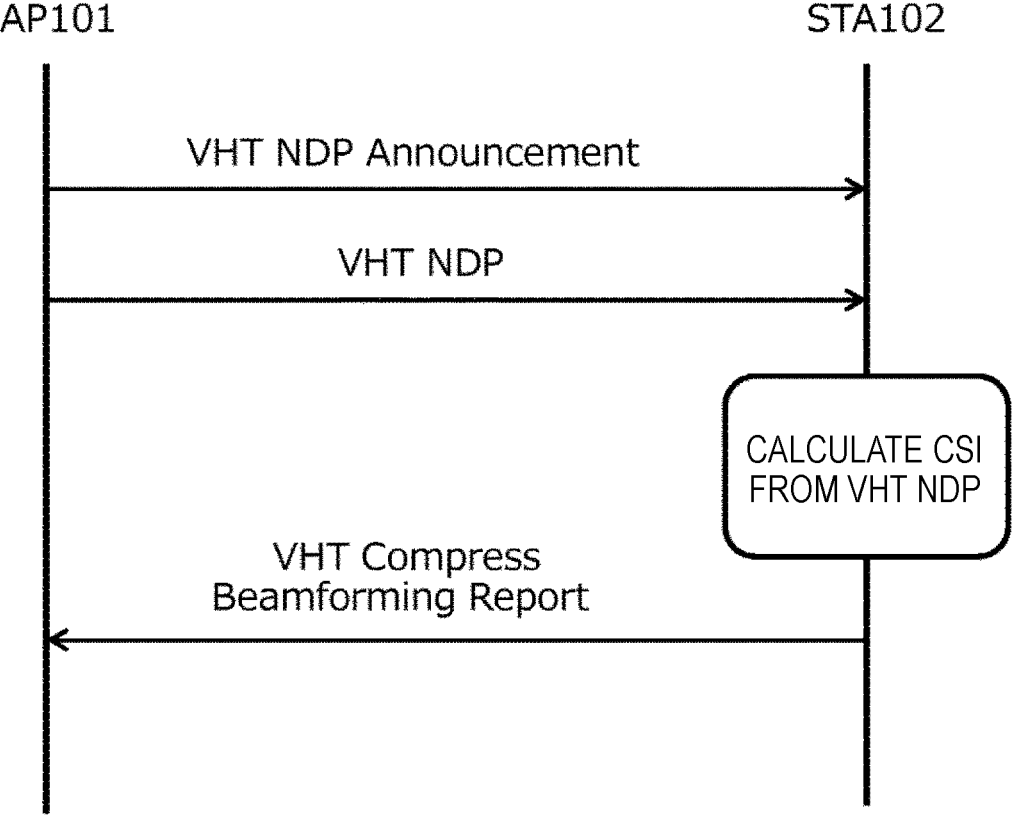
FIG. 2 is a diagram illustrating a sequence example of a reference signal.

FIG. 2 illustrates a sequence example of a reference signal. Here, the wireless LAN system 100 according to the present embodiment is configured of the AP 101 including the four antennas 104 and the STA 102 including the one antenna on the assumption of a wireless LAN of the IEEE 802.11ac standard. In the IEEE 802.11ac standard, a VHT NDP is used as a reference signal (RS) for measuring a state of the propagation path.

In FIG. 2, the AP 101 broadcasts a VHT NDP Announcement frame as a start signal of a sounding protocol for acquiring the CSI. Right after that, the AP 101 transmits the VHT NDP including data for measuring the CSI to the STA 102 that is a destination.

Here, the VHT is an abbreviation of Very High Throughput, and a VHT frame for performing ultrahigh speed communication is basically used in the IEEE 802.11ac standard. Also, the NDP is an abbreviation of Null Data Packet, and the VHT NDP is a frame that does not include communication data. The VHT NDP Announcement frame is a frame that includes addresses of the AP 101 and the STA 102 that is a destination for notifying the STA 102 of transmission of the VHT NDP in advance. Note that the VHT NDP Announcement frame is transmitted from one or more specific antennas, and even in a case in which the VHT NDP Announcement frame is transmitted from two or more antennas, a signal of the same data is transmitted from each of all the antennas.

In FIG. 2, the STA 102 that has received the VHT NDP from the AP 101 derives the value of CSI compressed by a method defined by IEEE 802.11ac. The STA 102 stores and transmits the derived compressed CSI in a VHT Compressed Beamforming Report. Here, the STA 102 obtains the CSI from each of the antennas 104 of the AP 101, and the amount of information of CSI to be fed back to the AP 101 increases if the number of antennas increases. Therefore, CSI (compressed CSI) selected by a predetermined condition from all pieces of CSI is fed back to the AP 101.

The AP 101 can acquire a state of a propagation path between each antenna 104 and the STA 102 on the basis of the compressed CSI fed back from the STA 102 and detect the object 103 inside the communication area from a change in state of the propagation path. Note that, in a case in which the detection of the object is performed on the side of the STA 102 instead of the AP 101, CSI held inside the STA 102 is used.

Figure 3:
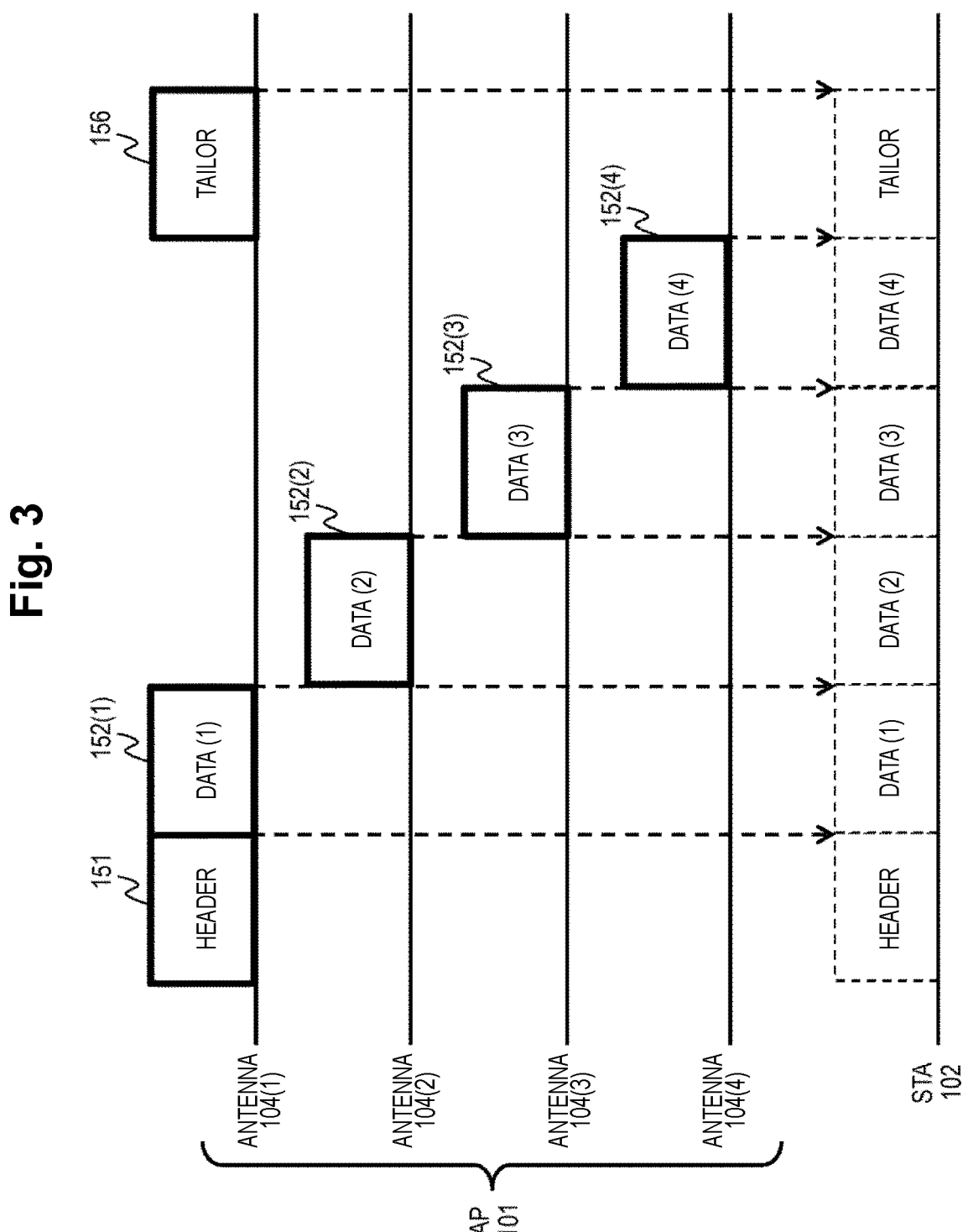
FIG. 3 is a diagram illustrating an example of a VHT NDP transmitted from an AP.

FIG. 3 illustrates a VHT NDP transmitted from the AP 101 illustrated in FIG. 1. In FIG. 3, the VHT NDP is configured of a header 151 (storing a frame type or the like), data 152, and a tailor 156 (storing error detection or the like). The header 151 and the tailor 156 are transmitted from the antenna 104(1), and the data 152 is a measurement signal for measuring a state of the propagation path, which is transmitted from each antenna 104 in a time division manner. In the example of FIG. 3, data 152(1) is transmitted from the antenna 104(1), data 152(2) is transmitted from the antenna 104(2), data 152(3) is transmitted from the antenna 104(3), and data 152(4) is transmitted from the antenna 104(4) in a time division manner. The data 152(1), the data 152(2), the data 152(3), and the data 152(4) transmitted from each antenna 104 are received as one VHT NDP by the STA 102.

Here, the VHT NDP corresponds to a reference signal during wireless sensing. The AP 101 transmits the VHT NDP for detecting an object inside the communication area, and the STA 102 calculates CSI for each antenna 104 on the basis of received data 152 of each antenna 104. Then, the STA 102 transmits the calculated CSI for each antenna 104 to the AP 101, and the AP 101 detects an object inside the communication area on the basis of the CSI for each antenna 104 received from the STA 102.

In this manner, the DATA 152 of the VHT NDP is individually transmitted from each of the four antennas 104 of the AP 101, and the STA 102 can thus acquire the CSI for each antenna 104. Note that the STA 102 compresses the calculated CSI by a method determined by the wireless LAN standard and replies with the compressed CSI as a VHT Compress Beam Forming Report to the AP 101.

Figure 4:
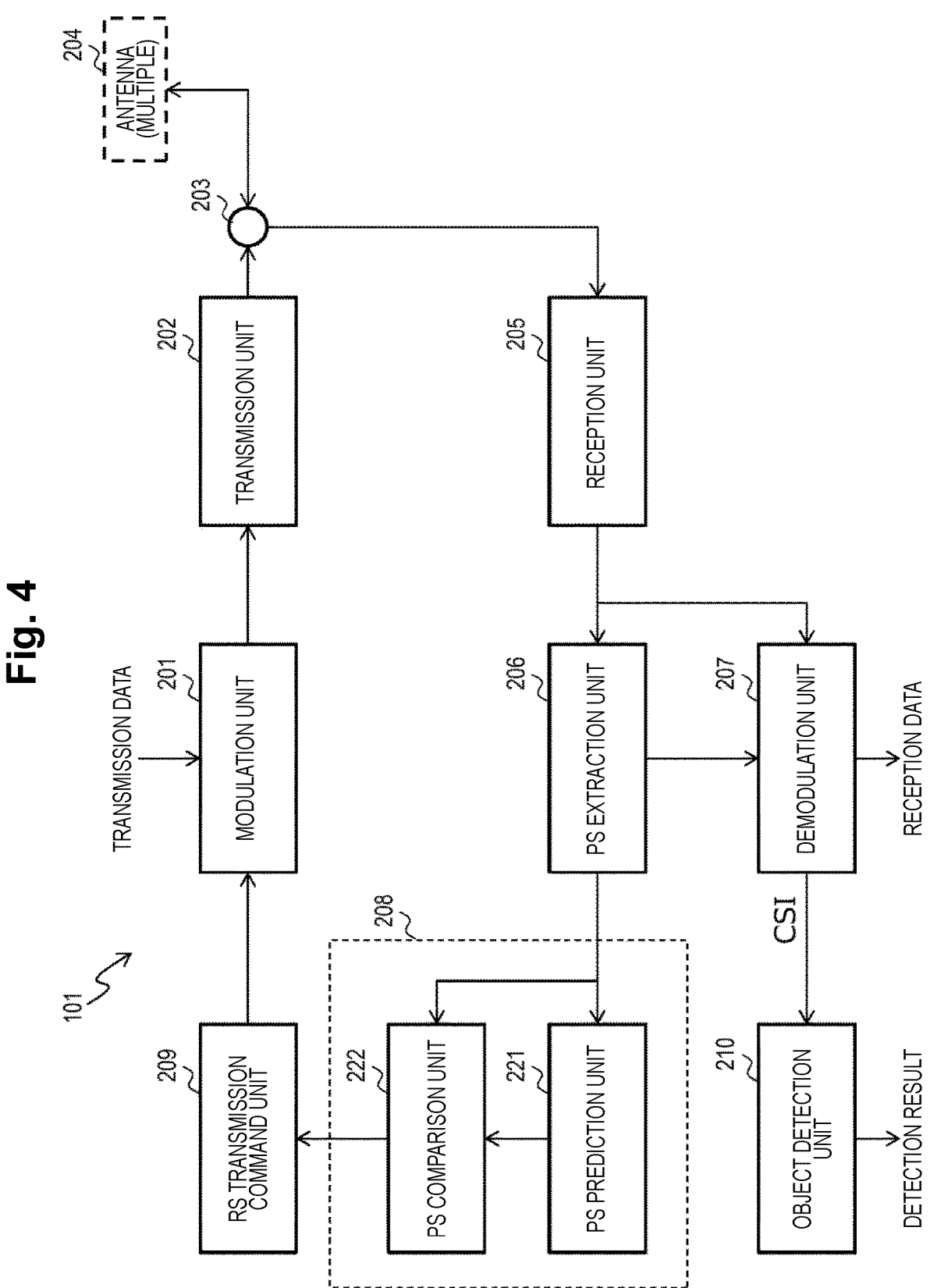
FIG. 4 is a diagram illustrating a configuration example of the AP.

FIG. 4 illustrates a configuration example of the AP 101. In FIG. 4, the AP 101 includes a modulation unit 201, a transmission unit 202, a circulator 203, antennas 204, a reception unit 205, a PS extraction unit 206, a demodulation unit 207, a transmission timing detection unit 208, an RS transmission command unit 209, and an object detection unit 210.

The modulation unit 201 modulates transmission data into a baseband signal by a modulation scheme determined according to the wireless LAN standard and transmits the baseband signal to the transmission unit 202. Also, the modulation unit 201 modulates a predetermined reference signal in a case in which the RS transmission command unit 209, which will be described later, provides a command for transmitting a predetermined reference signal. The modulated reference signal is output to the transmission unit 202 and is then transmitted to the STA 102 via the circulator 203 and the antennas 204. Here, the modulation unit 201 outputs signals of a plurality of channels corresponding to the plurality of antennas 204.

The transmission unit 202 converts the baseband signal output from the modulation unit 201 into a high-frequency signal and transmits the high-frequency signal from the antennas 104 to the STA 102 via the circulator 203. Here, the transmission unit 202 transmits the signals of the plurality of channels input from the modulation unit 201 from the plurality of antennas 204 to the STA 102.

The circulator 203 is a device for sharing the antenna 204 for transmission and reception. The circulator 203 outputs the transmission signal input from the transmission unit 202 to the antennas 104 and outputs the reception signal input from the antennas 104 to the reception unit 205.

The antennas 204 include a plurality of two or more antennas and include, for example, the antennas 104(1) to 104(4) illustrated in FIG. 1. The AP 101 transmits and receives wireless signals such as data signals, pilot signals, and reference signals between the antennas 204 and the STA 102.

The reception unit 205 converts a reception signal from each of a plurality of channels input from the plurality of antennas 104 of the antenna 204 via the circulator 203 into a baseband signal and outputs the baseband signal to the PS extraction unit 206 and the demodulation unit 207.

The PS extraction unit 206 extracts a pilot signal from the reception signal of each of the plurality of channels output by the reception unit 205 and outputs the extracted pilot signal to the demodulation unit 207 and the transmission timing detection unit 208.

The demodulation unit 207 performs processing such as synchronization establishment for demodulating the data signal on the basis of the pilot signal output from the PS extraction unit 206 and demodulates the reception data from the reception signal of the plurality of channels output by the reception unit 205. Note that description of an application for processing user data such as transmission data and reception data will be omitted in the embodiment.

The transmission timing detection unit 208 includes a PS prediction unit 221 and a PS comparison unit 222, which will be described later, and performs processing of detecting a transmission timing for a reference signal for the STA 102 to measure a state of the propagation path on the basis of the pilot signal output from the PS extraction unit 206. Then, the transmission timing detection unit 208 outputs a trigger indicating a transmission timing for the reference signal to the RS transmission command unit 209. Note that the PS prediction unit 221 and the PS comparison unit 222 will be described later in detail.

The RS transmission command unit 209 provides a command for transmitting a predetermined reference signal to the modulation unit 201 on the basis of the trigger indicating the transmission timing of the reference signal output from the transmission timing detection unit 208.

The object detection unit 210 performs processing of detecting an object inside the communication area and outputs the detection result on the basis of the CSI indicating the state of the propagation path demodulated by the demodulation unit 207. Here, although detailed description of the method for detecting an object based on a state of the propagation path will be omitted since the method is a known technique, it is possible to detect presence/absence of an object, the position, the moving direction, and the like by calculating a temporal change or a correlation of the states of the propagation paths of each of the channels between the four antennas 104 of the AP 101 and the STA 102, for example. In a case in which the object 103 is moving in a direction from the antenna 104(4) to the antenna 104(1) in FIG. 1, for example, variations in state of the propagation path caused by the object 103 moves in a time order in the direction from the antenna 104(4) to the antenna 104(1). The object detection unit 210 can thus detect the object 103 inside the communication area. Note that description of an application using the detection result will be omitted in the embodiment.

Next, the PS prediction unit 221 and the PS comparison unit 222 of the transmission timing detection unit 208 will be described in detail.

The PS prediction unit 221 accumulates information (the phase, the amplitude, the reception power, and the like) related to the pilot signal output from the PS extraction unit 206 in a memory and performs processing of predicting a pilot signal to be received at next cycle on the basis of the past history. The phase of the pilot signal to be received at the next cycle is predicted by external insertion with a known technique such as linear interpolation or non-linear interpolation on the basis of the phase of the pilot signal in the past accumulated in the memory, for example. Here, the processing of the PS prediction unit 221 is performed for each of the plurality of channels.

The PS comparison unit 222 compares the predicted value of the pilot signal that is scheduled to be received at the next cycle predicted by the PS prediction unit 221 with an actually measured value of the pilot signal actually received at the next cycle and determines whether or not a predetermined condition is met. In a case in which the comparison result satisfies the predetermined condition, then the PS comparison unit 222 outputs a trigger indicating a transmission timing of a reference signal to the RS transmission command unit 209. Here, the PS comparison unit 222 calculates a difference between a predicted value of a phase, an amplitude, a reception power, or the like of the pilot signal and an actually measured value, for example, to determine that there is a high likelihood that the object 103 has entered the communication area in a case in which the difference is equal to or greater than a predetermined threshold value. Conversely, the PS comparison unit 222 determines that there is a low likelihood that the object 103 has entered the communication area in a case in which the difference between the predicted value and the actually measured value of the pilot signal is less than the predetermined threshold value.

In the case in which the difference is equal to or greater than the threshold value, then the PS comparison unit 222 outputs a trigger indicating a timing for transmitting the reference signal to the RS transmission command unit 209. Here, since the processing of the PS comparison unit 222 is performed for each of the plurality of channels, the trigger indicating the timing for transmitting the reference signal to the RS transmission command unit 209 is output in a case in which a difference in at least one of the plurality of channels is equal to or greater than the threshold value. Alternatively, the trigger indicating the timing for transmitting the reference signal to the RS transmission command unit 209 may be output in a case in which a difference between adjacent channels is equal to or greater than the threshold value. Further, the trigger indicating the timing for transmitting the reference signal to the RS transmission command unit 209 may be output in a case in which differences are equal to or greater than the threshold value continuously over a plurality of cycles in one channel or adjacent channels.

Then, the RS transmission command unit 209 provides, to the modulation unit 201, a command to transmit a predetermined reference signal using the transmission timing of the reference signal detected by the transmission timing detection unit 208 as a trigger as described in FIGS. 2 and 3.

In this manner, the AP 101 with an object detection function according to the embodiment uses the pilot signals transmitted and received at shorter intervals than those of the reference signals in addition to the conventional method of detecting an object by measuring a state of a propagation path using the reference signals transmitted at specific intervals. It is thus possible to realize shortening of the detection intervals for detecting the object and reduction of time occupancy of the reference signals for detecting the object with respect to the entire communication time while maintaining the transmission intervals of the reference signals for measuring the state of the propagation path as is conventionally done.

Figure 5:
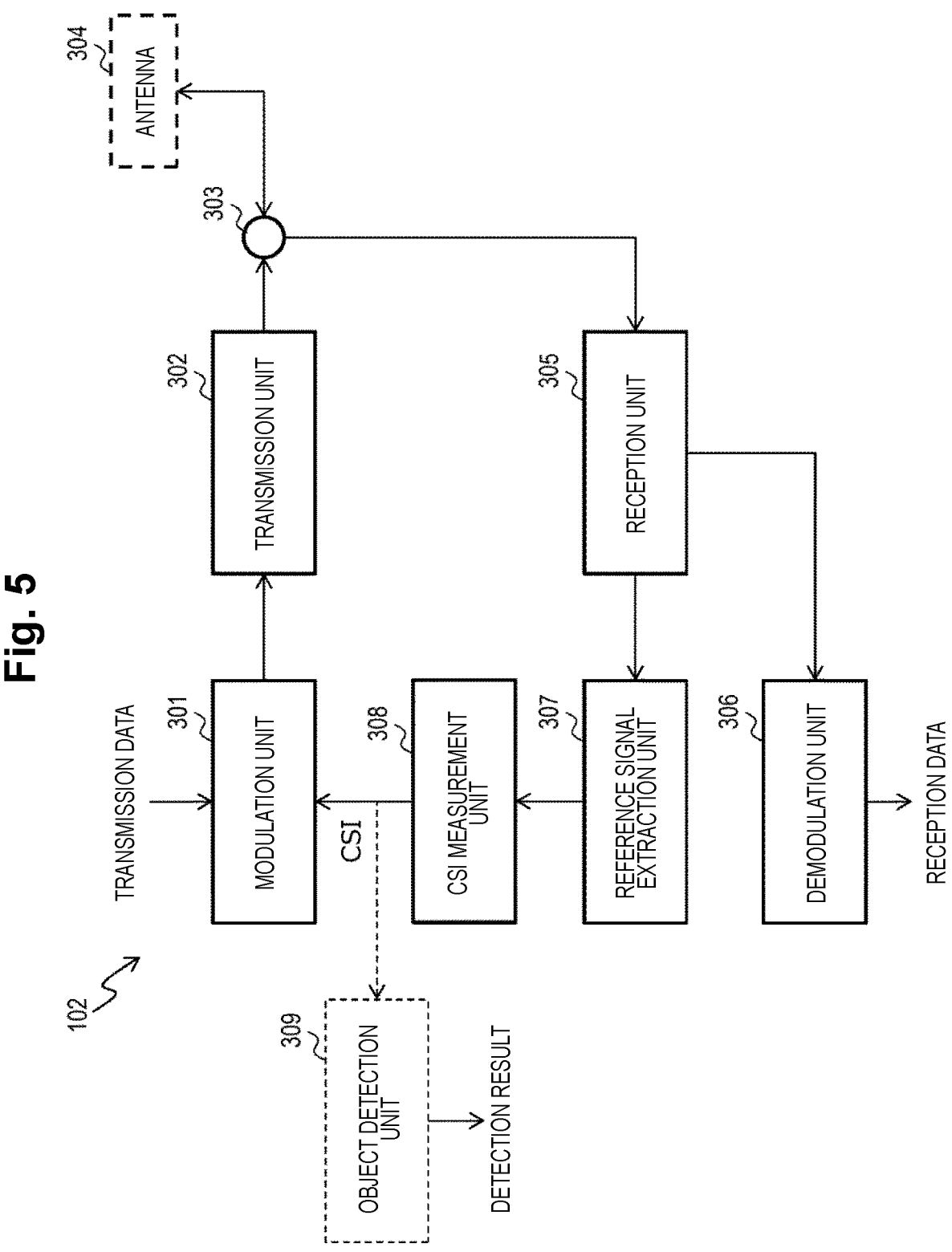
FIG. 5 is a diagram illustrating a configuration example of an STA.

FIG. 5 illustrates a configuration example of the STA 102. In FIG. 5, the STA 102 includes a modulation unit 301, a transmission unit 302, a circulator 303, an antenna 304, a reception unit 305, a demodulation unit 306, a reference signal extraction unit 307, and a CSI measurement unit 308. Note that, in a case in which the detection processing of the object 103 is performed on the side of the STA 102, an object detection unit 309 may be provided as illustrated in FIG. 5.

The modulation unit 301 modulates transmission data into a baseband signal by a modulation scheme determined by the wireless LAN standard and outputs the baseband signal to the transmission unit 302. Also, the modulation unit 301 modulates CSI for each antenna 104 of the AP 101 measured by the CSI measurement unit 308, which will be described later, into a baseband signal of a VHT Compress Beamforming Report frame, outputs the baseband signal to the transmission unit 302 and transmits the baseband signal to the AP 101 via the circulator 303 and the antenna 304.

The transmission unit 302 converts the baseband signal output from the modulation unit 301 into a high-frequency signal, and a wireless signal is transmitted from the antenna 304 to the AP 101 via the circulator 303.

The circulator 303 is a device for sharing the antenna 304 for transmission and reception. The transmission signal input from the transmission unit 302 is output from the antenna 304, and a reception signal input from the antenna 304 is output to the reception unit 305.

The antenna 304 transmits and receives wireless signals to and from the AP 101. Note that, although the number of antennas 304 is one in the embodiment, a plurality of antennas may configure the antennas 304.

The reception unit 305 converts a reception signal input from the antenna 304 via the circulator 303 into a baseband signal and outputs the baseband signal to the demodulation unit 306 and the reference signal extraction unit 307.

The demodulation unit 306 demodulates the reception signal output by the reception unit 305 into reception data. Note that description of an application for processing user data such as transmission data and reception data will be omitted in the embodiment.

The reference signal extraction unit 307 extracts a reference signal from the reception signal output by the reception unit 305 and outputs the reference signal to the CSI measurement unit 308. Here, the reference signal corresponds to a VHT NDP frame in the embodiment. Note that as illustrated in FIG. 3, data 152 for measuring CSI in the VHT NDP frame is extracted from each reception signal of each antenna 104 of the AP 101.

The CSI measurement unit 308 measures CSI for each antenna 104 on the basis of the data 152 for measuring CSI for each antenna 104 of the AP 101 output from the reference signal extraction unit 307. Then, the CSI measurement unit 308 outputs the measured CSI for each antenna 104 of the AP 101 to the modulation unit 301, stores the CSI in the VHT Compress Beamforming Report frame, and transmits it to the AP 101.

Note that, in a case in which detection of the object 103 is performed on the side of the STA 102, the STA 102 includes the object detection unit 309. In this case, the object detection unit 309 detects an object inside the communication area and outputs the detection result on the basis of the CSI measured by the CSI measurement unit 308. Although a known technique is used as a method for detecting an object on the basis of a state of a propagation path here, it is possible to detect presence/absence of an object, a moving direction, and the like by calculating a temporal change in state of each propagation path between the four antennas 104 of the AP 101 and the STA 102 and a correlation, for example, as described above in regard to the object detection unit 210 in FIG. 4. Note that description of an application using the detection result will be omitted in the embodiment.

Here, even in a case in which the object detection is performed by the STA 102, the AP 101 detects a change in pilot signals transmitted and received at shorter intervals than those of the reference signals and transmits a reference signal. It is thus possible to realize shortening of detection intervals for detecting the object and reduction of time occupancy of the reference signal for detecting the object with respect to the entire communication time.

Figure 6:
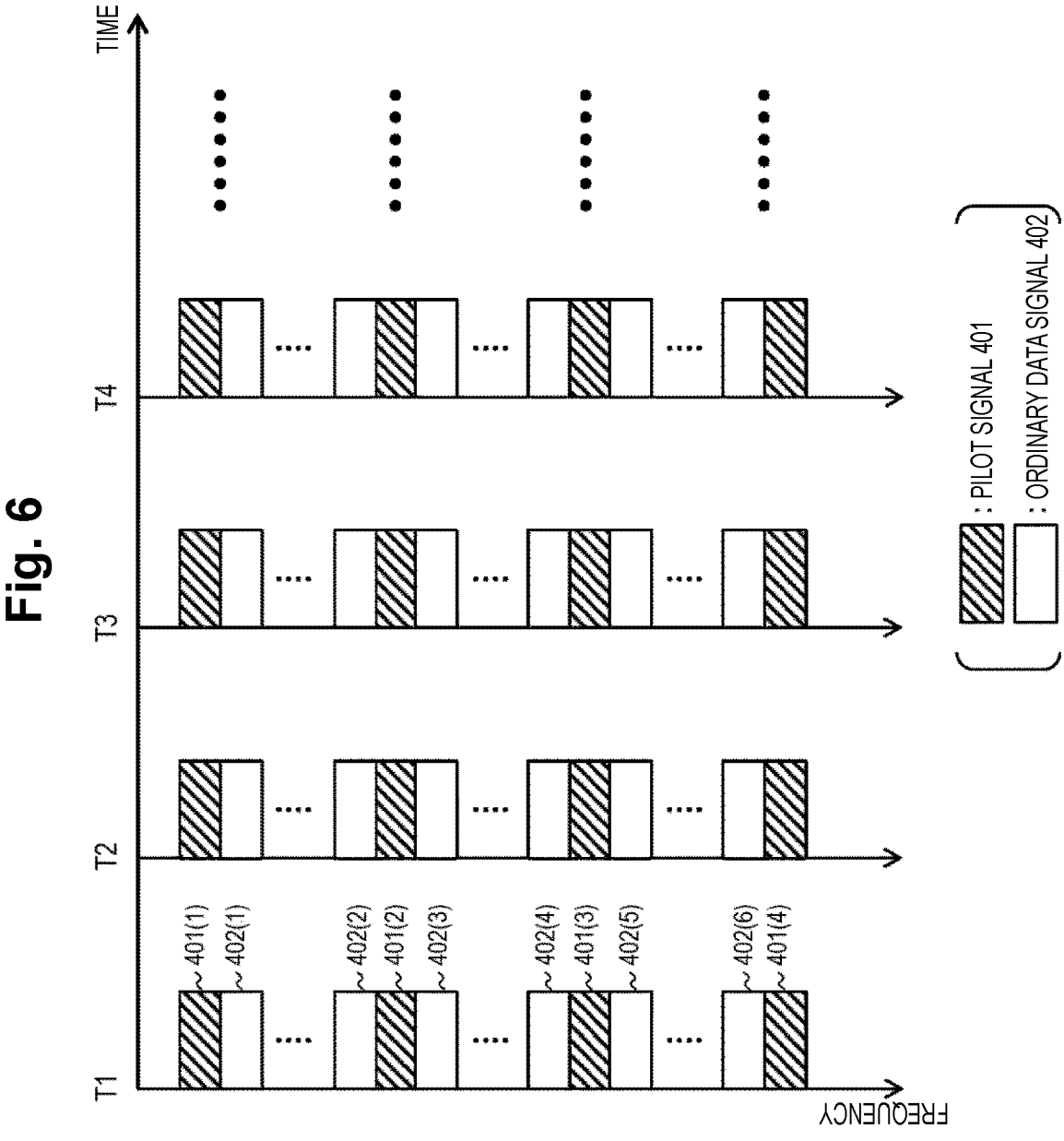
FIG. 6 is a diagram illustrating an example of a pilot signal.

FIG. 6 illustrates an example of a pilot signal. In FIG. 6, the horizontal axis represents a time, and a vertical axis represents a frequency. Also, FIG. 6 illustrates an example of orthogonal frequency division multiplexing (OFDM) transmission that is one type of multicarrier transmission including signals of a plurality of subcarriers with different frequencies.

In the example in FIG. 6, the multicarrier signals transmitted at a time T1 are configured of a pilot signal 401(1), a data signal 402(1), . . . , a data signal 402(2), a pilot signal 401(2), a data signal 402(3), . . . , a data signal 402(4), a pilot signal 401(3), a data signal 402(5), . . . , a data signal 402(6), and a pilot signal 401(4). Note that description of control signals other than the pilot signals 401 is omitted in FIG. 6. Here, (number) is added to the end of the reference sign and description like a pilot signal 401(1) is adopted, for example, only in a case in which a specific signal is indicated, and (number) at the end of the reference sign is omitted and description like a pilot signal 401 is adopted, for example, in a common case.

In FIG. 6, the pilot signals 401 are temporally sequentially transmitted through subcarriers with specific frequencies that are discretely arranged in the subcarriers of the ordinary data signals 402. Also, the pilot signals 401 are present in all wireless frames since they are needed to demodulate wireless signals (demodulate QAM and the like).

On the other hand, the VHT NDP frames for measuring states of propagation paths are transmitted at longer cycles than those of the pilot signals 401 in the wireless LAN standard. Even if a VHT NDP frame is transmitted at a position of an ordinary data signal 402 at the time T1, for example, the VHT NDP frame is not transmitted at the next time T2. Therefore, the intervals for transmitting VHT NDP frames for measuring CSI described in FIG. 3 become long, and the intervals of the processing of detecting the object on the basis of the CSI also become long.

Thus, according to the object detection method of the embodiment, the pilot signals 401 transmitted and received at shorter intervals than those of the VHT NDP frames are used. In a case in which a change in pilot signals 401 is large, for example, it is possible to consider that the likelihood that some object has entered the communication area is high, and it is thus desirable to perform the processing of detecting the object at this timing. Thus, the AP 101 transmits a VHT NDP frame in a case in which a change in pilot signals 401 is equal to or greater than a predetermined magnitude, in addition to the ordinary VHT NDP frames periodically transmitted. It is thus possible to eliminate the unnecessary transmission of VHT NDP frames.

Note that the VHT NDP frame may be transmitted only in a case in which a change in pilot signals 401 is equal to or greater than a predetermined value without transmitting the ordinary VHT NDP frames that are periodically transmitted during the wireless sensing. In this case, a VHT NDP frame may be transmitted in a case in which a change in pilot signals 401 has not been detected in a predetermined specific period in order to avoid a state in which the VHT NDP frames are hot transmitted over a long period of time. Note that a method for detecting a change in pilot signals 401 will be described in FIG. 7, which will be described later.

In this manner, according to the object detection method of the present embodiment, it is possible to realize shortening of the detection intervals of the object detection and reduction of the time occupancy of the VHT NDP frame for detecting the object with respect to the entire communication time by controlling the transmission timing of the VHT NDP frame on the basis of the pilot signal 401.

Note that, in a case in which a pilot signal is present for each subcarrier, the VHT NDP frame may be transmitted when a sum of absolute values or square values of differences of the subcarriers is equal to or greater than a predetermined threshold value.

Alternatively, whether or not a difference is equal to or greater than a predetermined threshold value may be determined for each subcarrier, and in a case in which the proportion of the number of subcarriers with differences of equal to or greater than the threshold value is equal to or greater than a predetermined threshold value, the VHT NDP frame may be transmitted.

In addition, a pilot signal at a certain time may be extracted to calculate the difference in a case in which pilot signals are temporally sequentially transmitted as illustrated in FIG. 6. Alternatively, all the plurality of pilot signals included in a predetermined specific time width (specific period of time) may be used to calculate the difference.

Moreover, a difference between pilot signals of adjacent subcarriers may be calculated, and a predicted value of the difference of pilot signals of the same adjacent subcarriers received at a next cycle may be calculated on the basis of the calculated difference, instead of directly using the pilot signals. Then, a VHT NDP frame may be transmitted in a case in which a difference between the actually measured value of the difference between the pilot signals of the same adjacent subcarriers received at the next cycle and the predicted value calculated at the previous cycle is equal to or greater than a predetermined threshold value. In this manner, it is possible to remove influences of noise on the entire wireless LAN signals, such as phase noise, by using the difference between the pilot signals of the adjacent subcarriers.

Figure 7:
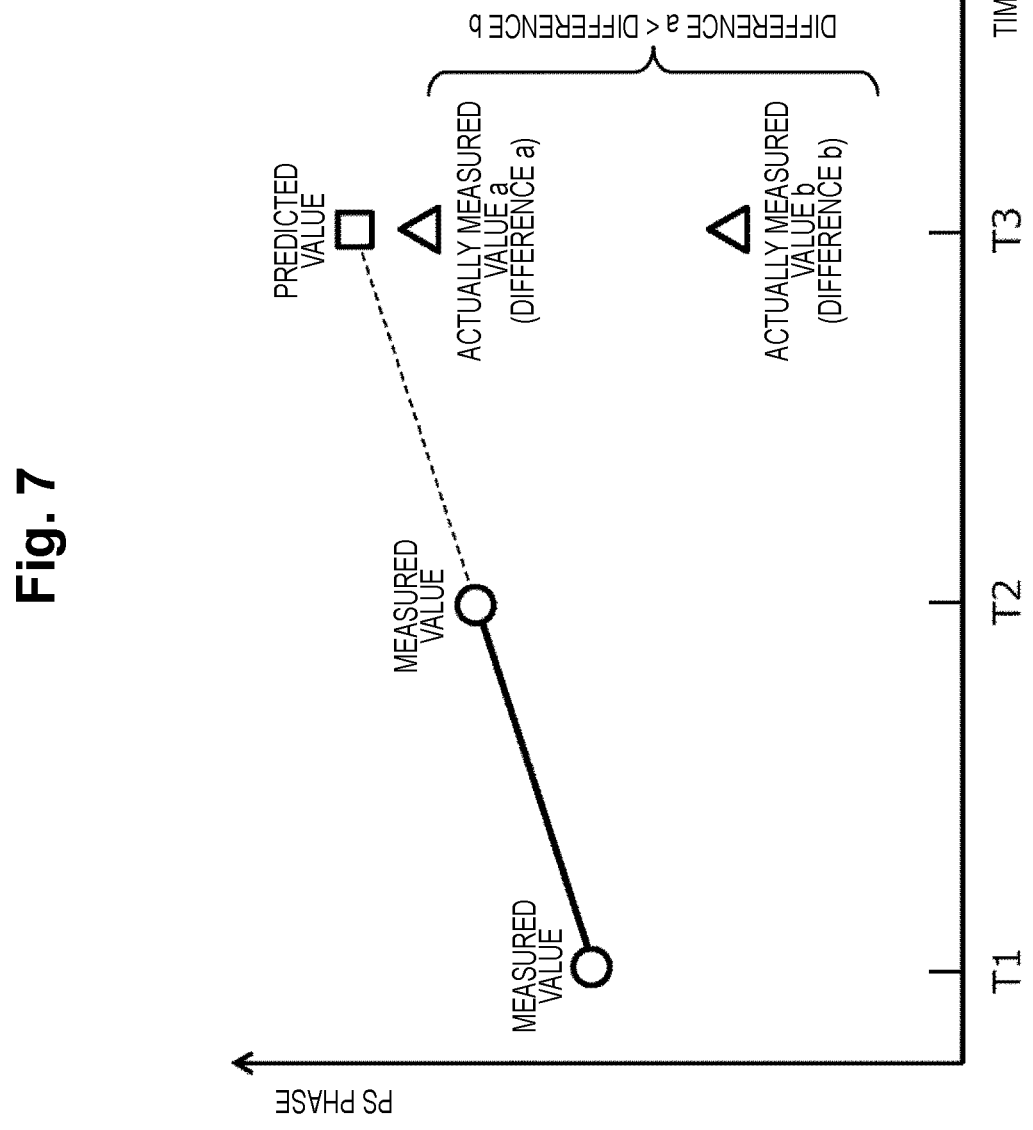
FIG. 7 is a diagram illustrating an example of a predicted value and an actually measured value of the pilot signal.

FIG. 7 illustrates an example of a predicted value and an actually measured value of a pilot signal. In FIG. 7, the vertical axis represents a phase of the pilot signal (PS), and the horizontal axis represents a time. Note that, although a phase of the pilot signal is used in the example in FIG. 7, other information such as an amplitude and reception power may be used. Also, the processing described above is executed by the PS prediction unit 221 and the PS comparison unit 222 of the transmission timing detection unit 208 described in FIG. 4.

In FIG. 7, the PS prediction unit 221 calculates a predicted value of a pilot signal scheduled to be received next, on the basis of a history of measurement values of the pilot signals received in the past. In a case in which the current time is T2 in FIG. 7, for example, a predicted value of a phase of a pilot signal at a future time T3 is calculated on the basis of a measured value of a phase of a pilot signal at the time T1 and a measured value of a phase of a pilot signal at the time T2. Note that the predicted value is calculated through external insertion by a known technique such as linear interpolation or non-linear interpolation.

When the current time becomes T3, then the PS comparison unit 222 compares the actually measured value of the phase of the pilot signal received at the time T3 with the predicted value calculated at the time T2.

Here, in a case in which actually measured values at the time T3 are an actually measured value a and an actually measured value b in FIG. 7, a difference a between the actually measured value a and the predicted value is smaller than a difference b between the actually measured value b and the predicted value. In other words, it is possible to determine that the likelihood that an object has entered the communication area is lower in the case of the actually measured value a than in the case of the actually measured value b. Conversely, it is possible to determine that the likelihood that an object had entered the communication area is higher in the case of the actually measured value b than in the case of the actually measured value a.

Thus, in a case in which the difference between the actually measured value and the predicted value is less than a threshold value, the PS comparison unit 222 determines that the likelihood that an object has entered the communication area is low and does not provide, to the RS transmission command unit 209, a command to transmit a reference signal. Conversely, in a case in which the difference between the actually measured value and the predicted value is equal to or greater than the threshold value, the PS comparison unit 222 determines that the likelihood that an object has entered the communication area is high and provides, to the RS transmission command unit 209, a command to transmit a reference signal.

In this manner, according to the object detection method of the present embodiment, a change in pilot signals transmitted and received at shorter intervals than those of the reference signals is detected, and a reference signal is transmitted. It is thus possible to realize shortening of detection intervals for detecting the object and reduction of time occupancy of the reference signal for detecting the object with respect to the entire communication time.

Here, a program corresponding to processing performed by each block or some of the blocks in the AP 101 described in FIG. 4 may be executed by a general-purpose computer or an integrated circuit such as a field programmable gate array (FPGA). Also, the program may be recorded and provided in a recording medium or may be provided through a network.

As described above, the wireless communication system with an object detection function, an object detection method, and a base station device according to the present invention controls a transmission timing for a reference signal using a pilot signal in a case in which an object inside the communication area is detected by the wireless communication system including the base station device and a terminal device. It is thus possible to transmit a reference signal for measuring a state of a propagation path at an appropriate timing without degrading a throughput of wireless communication.

REFERENCE SIGNS LIST

100 Wireless LAN system
101 AP
102 STA
103 Object
104, 204, 304 Antenna
201, 301 Modulation unit
202, 302 Transmission unit
203, 303 Circulator
205, 305 Reception unit
206 PS extraction unit
207, 306 Demodulation unit
208 Transmission timing detection unit
209 RS transmission command unit
210, 309 Object detection unit
307 Reference signal extraction unit
308 CSI measurement unit

The invention claimed is:

1. A wireless communication system that detects an object inside a communication area, comprising:
a base station device; and
a terminal device,
wherein the base station device controls a timing for transmitting a reference signal for measuring a state of a propagation path on the basis of a pilot signal included in a wireless signal received from the terminal device during wireless communication and detects an object inside the communication area on the basis of propagation state information indicating a state of the propagation path received from the terminal device during wireless sensing, and the terminal device transmits, to the base station device, the propagation state information measured on the basis of the reference signal received from the base station device;

wherein the base station device calculates a predicted value of a pilot signal to be received at a next cycle on the basis of a measured value of the pilot signal periodically received from the terminal device, and transmits the reference signal in a case in which a difference between the predicted value and an actually measured value of the pilot signal received at the next cycle is equal to or greater than a predetermined threshold value.

2. A wireless communication system that detects an object inside a communication area, comprising:

a base station device; and a terminal device, wherein the base station device controls a timing for transmitting a reference signal for measuring a state of a propagation path on the basis of a pilot signal included in a wireless signal received from the terminal device during wireless communication and detects an object inside the communication area on the basis of propagation state information indicating a state of the propagation path received from the terminal device during wireless sensing, and the terminal device transmits, to the base station device, the propagation state information measured on the basis of the reference signal received from the base station device;

wherein the base station device and the terminal device perform multicarrier transmission using a plurality of subcarriers, and the base station device calculates a difference between pilot signals of adjacent subcarriers, calculates, on the basis of the difference, a predicted value of the difference of pilot signals of the same adjacent subcarriers to be received at the next cycle, and transmits the reference signal in a case in which a difference between an actually measured value of the difference received at the next cycle and the predicted value is equal to or greater than a predetermined threshold value.

3. An object detection method of detecting an object inside a communication area of a wireless communication system including a base station device and a terminal device, the method comprising:

by the base station device, controlling a timing for transmitting a reference signal for measuring a state of a propagation path on the basis of a pilot signal included in a wireless signal received from the terminal device during wireless communication and detecting an object inside the communication area on the basis of propagation state information indicating a state of the propagation path received from the terminal device during wireless sensing; and by the terminal device, transmitting, to the base station device, the propagation state information measured on the basis of the reference signal received from the base station device;

wherein the base station device calculates a predicted value of a pilot signal to be received at a next cycle on the basis of a measured value of the pilot signal periodically received from the terminal device, and transmits the reference signal in a case in which a difference between the predicted value and an actually measured value of the pilot signal received at the next cycle is equal to or greater than a predetermined threshold value.

4. An object detection method of detecting an object inside a communication area of a wireless communication system including a base station device and a terminal device, the method comprising:

by the base station device, controlling a timing for transmitting a reference signal for measuring a state of a propagation path on the basis of a pilot signal included in a wireless signal received from the terminal device during wireless communication and detecting an object inside the communication area on the basis of propagation state information indicating a state of the propagation path received from the terminal device during wireless sensing; and by the terminal device, transmitting, to the base station device, the propagation state information measured on the basis of the reference signal received from the base station device;

wherein the base station device and the terminal device perform multicarrier transmission using a plurality of subcarriers, and the base station device calculates a difference between pilot signals of adjacent subcarriers, calculates, on the basis of the difference, a predicted value of the difference of pilot signals of the same adjacent subcarriers to be received at the next cycle, and transmits the reference signal in a case in which a difference between an actually measured value of the difference received at the next cycle and the predicted value is equal to or greater than a predetermined threshold value.

5. A base station device that performs wireless communication with a terminal device and detects an object inside a communication area, comprising:

a detection unit that detects a timing for transmitting a reference signal for measuring a state of a propagation path on the basis of a pilot signal included in a wireless signal received from the terminal device during wireless communication;

a transmission unit that transmits a reference signal for measuring a state of the propagation path at the transmission timing detected by the detection unit on the basis of the pilot signal; and an object detection unit that receives propagation state information measured using the reference signal from the terminal device and detects an object inside the communication area on the basis of the propagation state information;

wherein the detection unit includes a prediction unit that calculates a predicted value of a pilot signal to be received at a next cycle on the basis of a measured value of the pilot signal periodically received from the terminal device, and a comparison unit that detects, as a transmission timing of the reference signal, a difference between the predicted value and an actually measured value of the pilot signal received at the next cycle in a case in which the difference is equal to or greater than a predetermined threshold value.

* * * * *